United States Patent
Cook et al.

(10) Patent No.: US 9,124,120 B2
(45) Date of Patent: Sep. 1, 2015

(54) WIRELESS POWER SYSTEM AND PROXIMITY EFFECTS

(75) Inventors: Nigel P. Cook, El Cajon, CA (US); Paul Meier, Hamilton (NZ); Marc Secall, Fribourg (CH)

(73) Assignee: QUALCOMM Incorporated, San Diego, CA (US)

( * ) Notice: Subject to any disclaimer, the term of this patent is extended or adjusted under 35 U.S.C. 154(b) by 1323 days.

(21) Appl. No.: 12/136,764

(22) Filed: Jun. 10, 2008

(65) Prior Publication Data

US 2009/0045772 A1     Feb. 19, 2009

Related U.S. Application Data

(60) Provisional application No. 60/943,269, filed on Jun. 11, 2007.

(51) Int. Cl.
   *H02J 7/02*     (2006.01)
   *H04B 1/18*     (2006.01)
   *H04B 1/00*     (2006.01)

(52) U.S. Cl.
    CPC ..................... *H02J 7/025* (2013.01)

(58) Field of Classification Search
    USPC ............. 455/130, 150.1, 151.1, 151.2, 151.3; 320/108
    See application file for complete search history.

(56) References Cited

U.S. PATENT DOCUMENTS

| | | |
|---|---|---|
| 3,098,971 A | 7/1963 | Richardson |
| 3,480,229 A | 11/1969 | Entremont |
| 3,588,905 A | 6/1971 | Dunlavy, Jr. |
| 3,675,108 A | 7/1972 | Nicholl |
| 3,918,062 A | 11/1975 | Haruki et al. |
| 3,938,018 A | 2/1976 | Dahl |
| 3,999,185 A | 12/1976 | Polgar, Jr. et al. |
| 4,088,999 A | 5/1978 | Fletcher et al. |
| 4,388,524 A | 6/1983 | Walton |
| 4,390,924 A | 6/1983 | Nebiker, Jr. |
| 4,473,825 A | 9/1984 | Walton |
| 4,524,411 A | 6/1985 | Willis |
| 4,760,394 A * | 7/1988 | Takeuchi et al. ............ 340/10.42 |
| 4,914,539 A | 4/1990 | Turner et al. |
| 4,959,568 A | 9/1990 | Stokes |
| 4,959,764 A | 9/1990 | Bassett |
| 5,027,709 A | 7/1991 | Slagle |

(Continued)

FOREIGN PATENT DOCUMENTS

| | | |
|---|---|---|
| CN | 1202025 A | 12/1998 |
| CN | 1231069 A | 10/1999 |

(Continued)

OTHER PUBLICATIONS

Harrist, Wireless battery charging system using radio frequency energy harvesting, Master of Science Thesis, University of Pittsburgh, 2004.

(Continued)

*Primary Examiner* — Bot Ledynh
(74) *Attorney, Agent, or Firm* — Knobbe Martens Olson & Bear LLP

(57) ABSTRACT

A wireless powering and charging system is described. Such a system comprises a radio frequency transmitter (typically a home-appliance sized unit on a desk or a shelf) and a receiver (typically a small mobile unit carried by the user). When the user is in range of the transmitter, charging or powering can take place in the mobile unit.

19 Claims, 7 Drawing Sheets

(56) References Cited

U.S. PATENT DOCUMENTS

| | | |
|---|---|---|
| 5,072,233 A | 12/1991 | Zanzig |
| 5,153,583 A | 10/1992 | Murdoch |
| 5,175,561 A | 12/1992 | Goto |
| 5,225,847 A | 7/1993 | Roberts et al. |
| 5,287,262 A * | 2/1994 | Klein ............................ 363/134 |
| 5,387,818 A | 2/1995 | Leibowitz |
| 5,396,538 A | 3/1995 | Hong |
| 5,397,962 A | 3/1995 | Moslehi |
| 5,400,036 A | 3/1995 | Kochiyama et al. |
| 5,400,037 A | 3/1995 | East |
| 5,438,699 A | 8/1995 | Coveley |
| 5,450,305 A | 9/1995 | Boys et al. |
| 5,455,466 A * | 10/1995 | Parks et al. ................... 307/104 |
| 5,491,715 A | 2/1996 | Flaxl |
| 5,519,262 A | 5/1996 | Wood |
| 5,574,441 A * | 11/1996 | Roes et al. ............... 340/870.31 |
| 5,596,567 A | 1/1997 | Demuro et al. |
| 5,608,417 A | 3/1997 | De Vall |
| 5,621,322 A | 4/1997 | Ehnholm |
| 5,621,913 A | 4/1997 | Tuttle et al. |
| 5,654,621 A | 8/1997 | Seelig |
| 5,684,828 A | 11/1997 | Bolan et al. |
| 5,701,121 A | 12/1997 | Murdoch |
| 5,734,255 A | 3/1998 | Thompson et al. |
| 5,754,948 A | 5/1998 | Metze |
| 5,767,601 A | 6/1998 | Uchiyama |
| 5,796,240 A | 8/1998 | Saito et al. |
| 5,812,065 A | 9/1998 | Schrott et al. |
| 5,821,638 A | 10/1998 | Boys et al. |
| 5,826,178 A | 10/1998 | Owen |
| 5,856,710 A | 1/1999 | Baughman et al. |
| 5,936,575 A | 8/1999 | Azzarelli et al. |
| 5,963,012 A | 10/1999 | Garcia et al. |
| 5,966,941 A | 10/1999 | Ghoshal |
| 5,975,714 A | 11/1999 | Vetorino et al. |
| 5,982,139 A | 11/1999 | Parise |
| 6,016,046 A | 1/2000 | Kaite et al. |
| 6,028,413 A | 2/2000 | Brockmann |
| 6,031,708 A | 2/2000 | Guermeur |
| 6,040,680 A | 3/2000 | Toya et al. |
| 6,040,986 A | 3/2000 | Sakamoto et al. |
| 6,104,354 A | 8/2000 | Hill et al. |
| 6,114,834 A | 9/2000 | Parise |
| 6,118,249 A | 9/2000 | Brockmann et al. |
| 6,127,799 A | 10/2000 | Krishnan |
| 6,175,124 B1 | 1/2001 | Cole et al. |
| 6,184,651 B1 | 2/2001 | Fernandez et al. |
| 6,265,789 B1 | 7/2001 | Honda et al. |
| 6,275,681 B1 | 8/2001 | Vega et al. |
| 6,291,901 B1 | 9/2001 | Cefo |
| 6,317,338 B1 | 11/2001 | Boys |
| 6,321,067 B1 | 11/2001 | Suga et al. |
| 6,337,628 B2 | 1/2002 | Campana, Jr. |
| 6,341,076 B1 | 1/2002 | Kadatskyy et al. |
| 6,411,824 B1 | 6/2002 | Eidson |
| 6,437,685 B2 | 8/2002 | Hanaki |
| 6,501,364 B1 | 12/2002 | Hui et al. |
| 6,507,152 B2 | 1/2003 | Matsumoto et al. |
| 6,523,493 B1 | 2/2003 | Brcka |
| 6,556,054 B1 | 4/2003 | Goodman et al. |
| 6,633,026 B2 | 10/2003 | Tuominen |
| 6,636,146 B1 | 10/2003 | Wehoski |
| 6,670,864 B2 | 12/2003 | Hyvonen et al. |
| 6,798,716 B1 | 9/2004 | Charych |
| 6,803,744 B1 | 10/2004 | Sabo |
| 6,879,076 B2 | 4/2005 | Long |
| 6,882,128 B1 | 4/2005 | Rahmel et al. |
| 6,891,287 B2 | 5/2005 | Moret |
| 6,912,137 B2 | 6/2005 | Berghegger |
| 6,960,968 B2 | 11/2005 | Odendaal et al. |
| 6,965,352 B2 | 11/2005 | Ohara et al. |
| 6,967,462 B1 | 11/2005 | Landis |
| 6,972,542 B2 | 12/2005 | Patino et al. |
| 6,972,543 B1 | 12/2005 | Wells |
| 7,012,405 B2 | 3/2006 | Nishida et al. |
| 7,068,991 B2 | 6/2006 | Parise |
| 7,076,206 B2 | 7/2006 | Elferich et al. |
| 7,095,301 B2 | 8/2006 | Hidaka et al. |
| 7,110,462 B2 | 9/2006 | Monsen |
| 7,116,018 B2 | 10/2006 | Strobl |
| 7,142,811 B2 * | 11/2006 | Terranova et al. ........... 455/41.1 |
| 7,154,451 B1 | 12/2006 | Sievenpiper |
| 7,164,344 B2 | 1/2007 | Deguchi et al. |
| 7,167,139 B2 | 1/2007 | Kim et al. |
| 7,180,265 B2 | 2/2007 | Naskali et al. |
| 7,180,291 B2 | 2/2007 | Chmielewski et al. |
| 7,209,792 B1 | 4/2007 | Parramon et al. |
| 7,212,414 B2 | 5/2007 | Baarman |
| 7,215,061 B2 | 5/2007 | Kihara et al. |
| 7,248,165 B2 | 7/2007 | Collins et al. |
| 7,256,532 B2 | 8/2007 | Viehland et al. |
| 7,257,093 B1 | 8/2007 | Witzke et al. |
| 7,262,701 B1 | 8/2007 | Nguyen |
| 7,380,150 B2 | 5/2008 | Meier et al. |
| 7,423,518 B2 | 9/2008 | Yamada |
| 7,511,500 B2 | 3/2009 | Schiano et al. |
| 7,525,283 B2 | 4/2009 | Cheng et al. |
| 7,554,316 B2 | 6/2009 | Stevens et al. |
| 7,598,646 B2 | 10/2009 | Cleveland |
| 7,603,077 B2 | 10/2009 | Onomatsu et al. |
| 7,675,197 B2 | 3/2010 | Tetlow |
| 7,676,263 B2 | 3/2010 | Harris et al. |
| 7,688,036 B2 | 3/2010 | Yarger et al. |
| 7,755,552 B2 | 7/2010 | Schantz et al. |
| 7,760,151 B2 | 7/2010 | Poilasne et al. |
| 7,777,396 B2 | 8/2010 | Rastegar et al. |
| 7,825,543 B2 | 11/2010 | Karalis et al. |
| 7,839,124 B2 | 11/2010 | Yamazaki et al. |
| 7,844,306 B2 | 11/2010 | Shearer et al. |
| 7,868,482 B2 | 1/2011 | Greene et al. |
| 7,885,050 B2 | 2/2011 | Lee |
| 8,055,310 B2 | 11/2011 | Beart et al. |
| 8,159,412 B2 | 4/2012 | Yun et al. |
| 8,169,185 B2 * | 5/2012 | Partovi et al. ................. 320/108 |
| 8,253,278 B2 | 8/2012 | Cook et al. |
| 8,373,514 B2 | 2/2013 | Cook et al. |
| 8,378,522 B2 | 2/2013 | Cook et al. |
| 8,378,523 B2 | 2/2013 | Cook et al. |
| 2001/0012208 A1 | 8/2001 | Boys |
| 2001/0026244 A1 | 10/2001 | Ieda et al. |
| 2001/0029167 A1 | 10/2001 | Takeda et al. |
| 2002/0017979 A1 | 2/2002 | Krause et al. |
| 2002/0029797 A1 | 3/2002 | Mikami et al. |
| 2002/0036977 A1 | 3/2002 | Lenssen et al. |
| 2002/0057161 A1 | 5/2002 | Katsura et al. |
| 2002/0057584 A1 | 5/2002 | Brockmann |
| 2002/0123779 A1 | 9/2002 | Zarinetchi et al. |
| 2002/0150065 A1 | 10/2002 | Ponnekanti |
| 2002/0160722 A1 | 10/2002 | Terranova et al. |
| 2002/0180584 A1 | 12/2002 | McGregor et al. |
| 2002/0190908 A1 | 12/2002 | Andrews et al. |
| 2003/0090353 A1 | 5/2003 | Robinson et al. |
| 2003/0144031 A1 | 7/2003 | Ono et al. |
| 2003/0162566 A1 | 8/2003 | Shapira et al. |
| 2003/0174099 A1 | 9/2003 | Bauer et al. |
| 2003/0193438 A1 | 10/2003 | Yoon |
| 2003/0199778 A1 | 10/2003 | Mickle et al. |
| 2003/0203733 A1 | 10/2003 | Sharon |
| 2003/0214961 A1 | 11/2003 | Nevo et al. |
| 2004/0001029 A1 | 1/2004 | Parsche et al. |
| 2004/0002835 A1 * | 1/2004 | Nelson ........................... 702/188 |
| 2004/0130425 A1 | 7/2004 | Dayan et al. |
| 2004/0150521 A1 | 8/2004 | Stilp |
| 2004/0160323 A1 | 8/2004 | Stilp |
| 2004/0183622 A1 | 9/2004 | Gevorgian et al. |
| 2004/0204781 A1 | 10/2004 | Hsien |
| 2004/0212500 A1 | 10/2004 | Stilp |
| 2004/0227002 A1 | 11/2004 | Watanabe |
| 2004/0227057 A1 | 11/2004 | Tuominen et al. |
| 2004/0227619 A1 | 11/2004 | Watanabe |
| 2005/0007239 A1 | 1/2005 | Woodard et al. |
| 2005/0017677 A1 | 1/2005 | Burton et al. |
| 2005/0029351 A1 | 2/2005 | Yoshinaga et al. |
| 2005/0043055 A1 | 2/2005 | Vance |

(56) References Cited

U.S. PATENT DOCUMENTS

| | | |
|---|---|---|
| 2005/0057422 A1 | 3/2005 | Deguchi et al. |
| 2005/0075697 A1 | 4/2005 | Olson et al. |
| 2005/0104457 A1 | 5/2005 | Jordan et al. |
| 2005/0125093 A1 | 6/2005 | Kikuchi et al. |
| 2005/0127867 A1 | 6/2005 | Calhoon et al. ............ 320/108 |
| 2005/0131495 A1 | 6/2005 | Parramon et al. ............ 607/61 |
| 2005/0194926 A1 | 9/2005 | Di Stefano |
| 2005/0264452 A1 | 12/2005 | Fujishima et al. |
| 2005/0273143 A1 | 12/2005 | Kanzius et al. |
| 2006/0017438 A1 | 1/2006 | Mullen et al. |
| 2006/0032926 A1 | 2/2006 | Baba et al. |
| 2006/0061325 A1 | 3/2006 | Tang et al. |
| 2006/0071790 A1 | 4/2006 | Duron et al. |
| 2006/0094449 A1 | 5/2006 | Goldberg |
| 2006/0103355 A1 | 5/2006 | Patino et al. |
| 2006/0103506 A1 | 5/2006 | Rodgers et al. |
| 2006/0113955 A1 | 6/2006 | Nunally |
| 2006/0121639 A1 | 6/2006 | Tai et al. |
| 2006/0125703 A1 | 6/2006 | Ma et al. |
| 2006/0145659 A1 | 7/2006 | Patino et al. |
| 2006/0145660 A1 | 7/2006 | Black et al. |
| 2006/0159536 A1 | 7/2006 | Pu |
| 2006/0160517 A1 | 7/2006 | Yoon |
| 2006/0164312 A1 | 7/2006 | Mathieu |
| 2006/0176676 A1 | 8/2006 | Kuroda et al. |
| 2006/0208903 A1 | 9/2006 | Loh et al. |
| 2006/0239043 A1 | 10/2006 | Ohbo |
| 2006/0273756 A1 | 12/2006 | Bowling et al. |
| 2007/0010295 A1 | 1/2007 | Greene et al. |
| 2007/0029965 A1 | 2/2007 | Hui |
| 2007/0046433 A1 | 3/2007 | Mukherjee |
| 2007/0054705 A1 | 3/2007 | Liow et al. |
| 2007/0060221 A1 | 3/2007 | Burgan et al. |
| 2007/0082611 A1* | 4/2007 | Terranova et al. ............ 455/41.1 |
| 2007/0087719 A1 | 4/2007 | Mandal et al. |
| 2007/0091006 A1 | 4/2007 | Thober et al. |
| 2007/0096910 A1 | 5/2007 | Waters |
| 2007/0103110 A1 | 5/2007 | Sagoo |
| 2007/0103291 A1 | 5/2007 | Adams |
| 2007/0105524 A1 | 5/2007 | Fullam et al. |
| 2007/0114945 A1 | 5/2007 | Mattaboni et al. |
| 2007/0120678 A1 | 5/2007 | Posamentier |
| 2007/0126395 A1 | 6/2007 | Suchar |
| 2007/0126650 A1 | 6/2007 | Guenther |
| 2007/0135078 A1 | 6/2007 | Ljung |
| 2007/0139000 A1 | 6/2007 | Kozuma et al. |
| 2007/0145830 A1 | 6/2007 | Lee et al. |
| 2007/0146218 A1 | 6/2007 | Turner et al. |
| 2007/0156204 A1 | 7/2007 | Denker et al. |
| 2007/0164414 A1 | 7/2007 | Dokai et al. |
| 2007/0171681 A1 | 7/2007 | Baarman |
| 2007/0178945 A1 | 8/2007 | Cook et al. |
| 2007/0188326 A1 | 8/2007 | Pluss et al. |
| 2007/0205881 A1 | 9/2007 | Breed |
| 2007/0214940 A1 | 9/2007 | Stoneback |
| 2007/0222542 A1 | 9/2007 | Joannopolous |
| 2007/0229281 A1 | 10/2007 | Shionoiri et al. |
| 2007/0281625 A1 | 12/2007 | Boys |
| 2007/0285819 A1* | 12/2007 | Gerhardinger ............ 360/48 |
| 2007/0296393 A1 | 12/2007 | Malpas et al. |
| 2007/0296548 A1* | 12/2007 | Hall et al. ............ 340/10.1 |
| 2007/0298846 A1 | 12/2007 | Greene et al. |
| 2008/0003963 A1 | 1/2008 | Turner |
| 2008/0014897 A1 | 1/2008 | Cook et al. |
| 2008/0054638 A1 | 3/2008 | Greene et al. |
| 2008/0067874 A1 | 3/2008 | Tseng |
| 2008/0093454 A1 | 4/2008 | Yamazaki et al. |
| 2008/0093934 A1 | 4/2008 | Kato |
| 2008/0108862 A1 | 5/2008 | Jordan et al. |
| 2008/0122294 A1 | 5/2008 | Simon et al. |
| 2008/0122297 A1 | 5/2008 | Arai |
| 2008/0129147 A1 | 6/2008 | Thiesen et al. |
| 2008/0152183 A1* | 6/2008 | Janik et al. ............ 381/375 |
| 2008/0167755 A1 | 7/2008 | Curt |
| 2008/0186129 A1 | 8/2008 | Fitzgibbon |
| 2008/0191897 A1 | 8/2008 | McCollough ............ 340/625.22 |
| 2008/0211320 A1 | 9/2008 | Cook et al. |
| 2008/0211455 A1 | 9/2008 | Park et al. |
| 2008/0211630 A1 | 9/2008 | Butler et al. |
| 2008/0225564 A1 | 9/2008 | Bohm et al. |
| 2008/0293446 A1 | 11/2008 | Rofougaran et al. |
| 2008/0296978 A1 | 12/2008 | Finkenzeller et al. |
| 2008/0309452 A1 | 12/2008 | Zeine |
| 2008/0317274 A1* | 12/2008 | Kim ............ 381/370 |
| 2009/0002175 A1 | 1/2009 | Waters |
| 2009/0009177 A1 | 1/2009 | Kim et al. |
| 2009/0026907 A1 | 1/2009 | Davidowitz et al. |
| 2009/0051224 A1 | 2/2009 | Cook et al. |
| 2009/0052721 A1 | 2/2009 | Dabrowski |
| 2009/0058361 A1 | 3/2009 | John |
| 2009/0072627 A1 | 3/2009 | Cook et al. |
| 2009/0079268 A1 | 3/2009 | Cook et al. |
| 2009/0102296 A1 | 4/2009 | Greene et al. |
| 2009/0102419 A1 | 4/2009 | Gwon et al. |
| 2009/0109102 A1 | 4/2009 | Dokai et al. |
| 2009/0111531 A1 | 4/2009 | Cui et al. |
| 2009/0121713 A1 | 5/2009 | Van Helvoort |
| 2009/0146892 A1 | 6/2009 | Shimizu et al. |
| 2009/0167449 A1 | 7/2009 | Cook et al. |
| 2009/0171178 A1 | 7/2009 | He et al. |
| 2009/0204170 A1 | 8/2009 | Hastings et al. |
| 2009/0218884 A1 | 9/2009 | Soar |
| 2009/0243394 A1 | 10/2009 | Levine |
| 2009/0273242 A1 | 11/2009 | Cook |
| 2009/0299918 A1 | 12/2009 | Cook et al. |
| 2009/0308933 A1 | 12/2009 | Osada |
| 2010/0013434 A1 | 1/2010 | Taylor-Haw et al. |
| 2010/0068998 A1 | 3/2010 | Zyambo et al. |
| 2010/0109445 A1 | 5/2010 | Kurs et al. |
| 2010/0134366 A1 | 6/2010 | Yu |
| 2010/0176936 A1 | 7/2010 | Garber et al. |
| 2010/0277387 A1 | 11/2010 | Schantz et al. |
| 2010/0289331 A1 | 11/2010 | Shionoiri et al. |
| 2010/0289449 A1 | 11/2010 | Elo |
| 2010/0315045 A1 | 12/2010 | Zeine |
| 2011/0031821 A1 | 2/2011 | Greene et al. |
| 2011/0050166 A1 | 3/2011 | Cook et al. |
| 2011/0069516 A1 | 3/2011 | Greene et al. |
| 2011/0074349 A1 | 3/2011 | Ghovanloo |

FOREIGN PATENT DOCUMENTS

| | | |
|---|---|---|
| CN | 1237009 A | 12/1999 |
| CN | 2582188 Y | 10/2003 |
| CN | 1497768 A | 5/2004 |
| CN | 1545747 A | 11/2004 |
| CN | 1689190 A | 10/2005 |
| DE | 4023412 | 2/1992 |
| DE | 19509918 | 9/1996 |
| DE | 19729722 | 1/1999 |
| DE | 19938460 | 2/2001 |
| DE | 102004009896 | 9/2005 |
| DE | 102005053111 | 5/2007 |
| EP | 0568920 | 11/1993 |
| EP | 298707 | 9/1994 |
| EP | 724308 | 7/1996 |
| EP | 773509 | 4/2002 |
| EP | 1233547 A1 | 8/2002 |
| EP | 1302822 | 4/2003 |
| EP | 1315051 | 5/2003 |
| EP | 1003266 | 4/2006 |
| EP | 1413975 | 5/2007 |
| EP | 1892799 | 2/2008 |
| GB | 1280516 | 7/1972 |
| GB | 1343071 | 1/1974 |
| GB | 2070298 | 9/1981 |
| GB | 2318696 | 4/1998 |
| JP | S55133106 A | 10/1980 |
| JP | 57032144 | 2/1982 |
| JP | 62071430 A | 4/1987 |
| JP | S6312824 U | 1/1988 |
| JP | 1298901 A | 12/1989 |
| JP | H037034 A | 1/1991 |
| JP | H0449483 A | 2/1992 |

(56) References Cited

FOREIGN PATENT DOCUMENTS

| | | |
|---|---|---|
| JP | 4115606 A | 4/1992 |
| JP | H04112635 A | 4/1992 |
| JP | 04271201 | 9/1992 |
| JP | 5038232 A | 2/1993 |
| JP | H0541335 A | 2/1993 |
| JP | 05183318 | 7/1993 |
| JP | H05300663 A | 11/1993 |
| JP | 6044207 A | 2/1994 |
| JP | 06133476 | 5/1994 |
| JP | 6044207 U | 6/1994 |
| JP | 6303726 | 10/1994 |
| JP | 6327172 A | 11/1994 |
| JP | 6339232 | 12/1994 |
| JP | H07147212 A | 6/1995 |
| JP | 8033244 A | 2/1996 |
| JP | 8079976 | 3/1996 |
| JP | 8088942 | 4/1996 |
| JP | H08103039 A | 4/1996 |
| JP | 8130840 A | 5/1996 |
| JP | 8162689 A | 6/1996 |
| JP | 9037475 | 2/1997 |
| JP | H0962816 A | 3/1997 |
| JP | 9182322 | 7/1997 |
| JP | H1069533 A | 3/1998 |
| JP | 10097931 | 4/1998 |
| JP | 10145987 A | 5/1998 |
| JP | 10225020 | 8/1998 |
| JP | H1155878 A | 2/1999 |
| JP | H11032471 A | 2/1999 |
| JP | H1197262 A | 4/1999 |
| JP | 11143600 | 5/1999 |
| JP | 11188113 A | 7/1999 |
| JP | 11191146 | 7/1999 |
| JP | H11196541 A | 7/1999 |
| JP | 11215802 A | 8/1999 |
| JP | H11220813 A | 8/1999 |
| JP | 11332135 | 11/1999 |
| JP | H11308033 A | 11/1999 |
| JP | H11345292 A | 12/1999 |
| JP | 2000078763 | 3/2000 |
| JP | 2000133542 A | 5/2000 |
| JP | 2000173825 A | 6/2000 |
| JP | 2000175379 | 6/2000 |
| JP | 2000184606 A | 6/2000 |
| JP | 2000217279 | 8/2000 |
| JP | 2000285214 A | 10/2000 |
| JP | 2001024548 A | 1/2001 |
| JP | 2001177916 A | 6/2001 |
| JP | 2001186676 A | 7/2001 |
| JP | 2001197672 | 7/2001 |
| JP | 2001238372 A | 8/2001 |
| JP | 2001264432 A | 9/2001 |
| JP | 2001326526 A | 11/2001 |
| JP | 2001526374 | 12/2001 |
| JP | 2002017058 A | 1/2002 |
| JP | 2002078247 A | 3/2002 |
| JP | 2002508916 A | 3/2002 |
| JP | 2002152191 A | 5/2002 |
| JP | 2002163634 A | 6/2002 |
| JP | 2002290131 A | 10/2002 |
| JP | 2002320347 | 10/2002 |
| JP | 2003047177 A | 2/2003 |
| JP | 2003047178 A | 2/2003 |
| JP | 2003069335 A | 3/2003 |
| JP | 2003158651 A | 5/2003 |
| JP | 2003189507 A | 7/2003 |
| JP | 2003218624 A | 7/2003 |
| JP | 3465078 B2 | 11/2003 |
| JP | 2004096262 A | 3/2004 |
| JP | 2004187429 A | 7/2004 |
| JP | 2005020231 A | 1/2005 |
| JP | 2005039756 A | 2/2005 |
| JP | 2005045298 A | 2/2005 |
| JP | 2005137040 | 5/2005 |
| JP | 2005250545 A | 9/2005 |
| JP | 2005261187 A | 9/2005 |
| JP | 2006042519 | 2/2006 |
| JP | 2006048580 A | 2/2006 |
| JP | 2006053833 A | 2/2006 |
| JP | 2006510101 A | 3/2006 |
| JP | 2006115592 A | 4/2006 |
| JP | 2006149163 A | 6/2006 |
| JP | 2006254679 A | 9/2006 |
| JP | 2006296123 A | 10/2006 |
| JP | 2006296144 A | 10/2006 |
| JP | 2006523363 A | 10/2006 |
| JP | 2006317787 A | 11/2006 |
| JP | 2006323683 A | 11/2006 |
| JP | 2007060829 A | 3/2007 |
| JP | 2007110842 A | 4/2007 |
| JP | 2007129658 A | 5/2007 |
| JP | 2007200370 A | 8/2007 |
| JP | 2007280372 A | 10/2007 |
| JP | 2008508842 A | 3/2008 |
| JP | 2009501510 A | 1/2009 |
| JP | 2010539821 A | 12/2010 |
| KR | 102000017058 | 3/2000 |
| KR | 1020010000674 | 1/2001 |
| KR | 1020010030472 | 4/2001 |
| KR | 20020064451 A | 8/2002 |
| KR | 20050016879 A | 2/2005 |
| KR | 1020050019926 | 3/2005 |
| KR | 20060070795 A | 6/2006 |
| KR | 20070017804 A | 2/2007 |
| KR | 20070048071 A | 5/2007 |
| KR | 20100083846 A | 7/2010 |
| WO | WO8807732 | 10/1988 |
| WO | 9323908 A1 | 11/1993 |
| WO | WO9619028 | 6/1996 |
| WO | 9850993 A1 | 11/1998 |
| WO | WO9857413 | 12/1998 |
| WO | WO9930090 A1 | 6/1999 |
| WO | WO9950780 | 10/1999 |
| WO | WO9950806 | 10/1999 |
| WO | WO0167413 | 9/2001 |
| WO | WO02060215 | 8/2002 |
| WO | WO03077364 A2 | 9/2003 |
| WO | WO2004038887 | 5/2004 |
| WO | WO2004052563 | 6/2004 |
| WO | WO2004077550 | 9/2004 |
| WO | WO2005086279 | 9/2005 |
| WO | WO2006006636 A1 | 1/2006 |
| WO | WO2006011769 A1 | 2/2006 |
| WO | WO2006031785 | 3/2006 |
| WO | WO2007008646 A2 | 1/2007 |
| WO | WO2007048052 | 4/2007 |
| WO | WO2007077442 | 7/2007 |
| WO | WO2007083574 A1 | 7/2007 |

OTHER PUBLICATIONS

Dudek, et al., "High permeability micro-magneto-mechanical systems," International Journal of Applied Electromagnetics and Mechanics (2007), vol. 25, pp. 103-108.

Chunbo et al.,"Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date : Sep. 3-5, 2008 on pp. 1 Print ISBN: 978-1-4244-1848-0 INSPEC Accession No. 10394615 Digital Object Identifier : 10.1109/VPPC.2008.4677798 Date of Current Version : Nov. 18, 2008.

Karalis et al., "Efficient wireless no-rediative mid-range energy transfer", Science Direct, Annals of Physics, 323(1),34-48.(Jan. 2008). doi:10.1016/j.aop.2007.04.017.

Kim et al., "Electrically Small Magnetic Dipole Antennas With Quality Factors Approaching the Chu Lower Bound", Antennas and Propagation, IEEE Transactions on vol. 58 Issue: 6 Publication Date: Jun. 2010 pp. 1898-1906 Digital Object Identifier: 10.1109/TAP. 2010.2046864.

(56) References Cited

OTHER PUBLICATIONS

Miranda et al., "Wireless power transfer using weakly coupled magnetostatic resonators", Energy Conversion Congress and Exposition (ECCE), 2010 IEEE Digital Object Identifier: 10.1109/ECCE.2010.5617728 Publication Year: 2010, pp. 4179-4186 IEEE Conferences.

Yates et al., "Optimal transmission frequency for ultralow-power short-range radio links", Source: IEEE Transactions on Circuits and Systems I: Fundamental Theory and Applications, v 51, n 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.

Ozawa, R., et al., "Wireless Energy Transmission for Micro Aerial Vehicles Using a Microwave Phased Array," 3rd International Energy Conversion Engineering Conference, Aug. 15-18, 2005, San Francisco, CA, pp. 1-6.

Dong-Gi Youn et al, "A Study on the Fundamental Transmission Experiment for Wireless Power Transmission System," 1999 IEEE Conference, TENCON 99, vol. 2, pp. 1419-1422, Sep. 1999.

Finkenzeller, "RFID Handbook: Fundamentals and Applications in Contactless Smart Cards and Identification," Second Edition, Translated by Rachel Waddington, 2003, John Wiley & Sons Ltd., pp. 106-111.

McSpadden et al, "A High Conversion Efficiency 5.8 GHz Rectenna," 1997 IEEE Microwave Symposium, vol. 2, pp. 547-550, Jun. 1997.

McSpadden et al, "Theoretical and Experimental Investigation of a Rectenna Element for Microwave Power Transmission," 1992 IEEE Transactions on Microwave Theory and Techniques, vol. 40, pp. 2359-2366, Dec. 1992.

Kim et al., Switchable polymer-based thin film coils as a power module wireless neural interfaces, Sensors and Actuators, vol. A 136, Issue 1, May 2007 (available online Nov. 27, 2006), pp. 467-474.

Kurs et al., "Wireless Power Transfer via Strongly Coupled Magnetic Resonances", scimag.org, Jul. 6, 2007.

Myers et al., "A transcutaneous power transformer," Trans. Amer. Soc. Artif. Inter. Organs, vol. 14, 1968, pp. 210-219.

Shinohara et al, "Experimental Study of Large Rectenna Array for Microwave Energy Transmission," 1998 IEEE Transactions on Microwave Theory and Techniques, vol. 46, pp. 261-268, Mar. 1998.

Onizuka et al., A design methodology of chip-to-chip wireless power transmission system, Univ. of Tokyo, International Conference on Integrated Circuit Design and Technology, 2007 (ICICDT '07), IEEE, May-Jun. 2007, pp. 1-4.

Schuder et al., "High Level electromagnetic energy transfer through a closed wall", Inst.Radio Engrs. Int.Conf Record 9, pp. 119-126, 1961.

Schuder, "Powering an artificial heart:Birth of the inductively coupled-radio frequency system in 1960", Artificial organs, vol. 26, No. 11, 2002, pp. 909-915.

Tae-Whan Yoo et al, "Theoretical and Experimental Development of 10 and 35 GHz Rectennas," 1992 IEEE Transactions on Microwave Theory and Techniques, vol. 40, pp. 1259-1266, Jun. 1992.

Sekitani et al, "A Large-area Wireless Power-Transmission Sheet Using Printed Organic Transistors and Plastic Mems Switches," Nature Materials Letter, pp. 413-417; Jan. 2007.

"Wireless Non-Radiative Energy Transfer", MIT paper, publication and date unknown, believed to be 2007.

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

Bayrashev, Andrey, et al., "Low frequency wireless powering of microsystems using piezoelectric-magnetostrictive laminate composites," Sensors & Actuators A: Physical, Sep. 2004, vol. 114, Issue 2/3, pp. 244-249.

Kurs et al., "Wireless Power Transfer via Strongly Coupled Magnetic Resonances," Science, Jul. 12, 2012, vol. 317(83): 83-86.

Onizuka K., et al., "Chip-to-Chip Inductive Wireless Power Transmission System for SiP Applications," Conference 2006, IEEE Custom Integrated Circuits, IEEE, Piscataway, NJ, USA, Sep. 1, 2006, pp. 575-578, XP031052537.

Lo E., et al., "Wireless Battery Charger" (RF/Microwave to DC Conversion), EE 198B http://www.engr.sjsu.edu/rkwok/projects/EE198B%20-%20Wireless%20Battery%20Charger.pdf.

ATIS Telecom Glossary, available at http://www.atis.org/glossary/definition.aspx?id=5951, retrieved on Mar. 23, 2015, 1 Page.

IEEE 100 The Authoritative Dictionary of IEEE Standards Terms, Seventh Edition, the Institute of Electrical and Electronics Engineers, Inc. Published Dec. 2000, p. 121.

Japanese Office Action from related Japanese Application No. 2014-124233; Mar. 16, 2015; 18 pages.

\* cited by examiner

WIRELESS POWER SYSTEM AND PROXIMITY EFFECTS

This application claims priority from provisional application No. 60/943,269, filed Jun. 11, 2007, the disclosure of which is herewith incorporated by reference.

BACKGROUND

Our previous applications and provisional applications, including, but not limited to, U.S. patent application Ser. No. 12/018,069, filed Jan. 22, 2008, entitled "Wireless Apparatus and Methods", the disclosure of which is herewith incorporated by reference, describes wireless transfer of power.

The transmit and receiving antennas are preferably resonant antennas, which are substantially resonant, e.g., within 10% of resonance, 15% of resonance, or 20% of resonance. The antenna is preferably of a small size to allow it to fit into a mobile, handheld device where the available space for the antenna may be limited. An embodiment describes a high efficiency antenna for the specific characteristics and environment for the power being transmitted and received.

One embodiment may be usable in a configuration that transfers power between two antennas by storing energy in the near field of the transmitting antenna, rather than sending the energy into free space in the form of a travelling electromagnetic wave.

Embodiments operates with high quality factor (Q) antennas. This can reduce radiation resistance ($R_r$) and loss resistance ($R_l$).

In one embodiment, two high-Q antennas are placed such that they react similarly to a loosely coupled transformer, with one antenna inducing power into the other. The antennas preferably have Qs that are greater than 1000.

DETAILED DESCRIPTION

Figure 1:
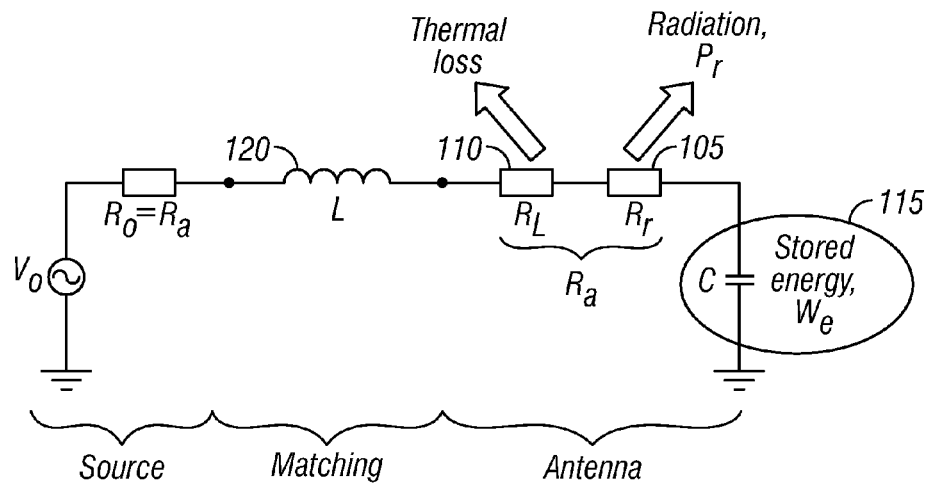
FIG. 1 shows a basic equivalent circuit.

A wireless link between the transmitter and the receiver is a critical part of an embodiment. A theory of small antennas, with a special focus on small loop antennas tuned to resonance is described.

Assuming maximum transmitter and receiver dimensions of 20 cm and 5 cm respectively, available received power is calculated over a range of frequencies from 1.3 to 500 MHz and separations of 1 m to 3 m to determine optimum separation and parameters. During the analysis, care is taken to avoid exceeding the MPE (Maximum Permissible Exposure) limits for radio transmitters according to FCC CFR 47.

The analysis was performed using Matlab simulation software. The results obtained by simulation correspond very closely to the theoretical predictions.

In one embodiment, the efficiency of the system increases at higher frequencies (shorter wavelengths) and so the available received power increases. The MPE limits have one goal to reduce the permitted radiated power levels at higher frequencies. Hence, this effect generally dominates the effect on MPE. An embodiment discloses a system and parameters where frequencies are optimum in the 150 to 250 MHz range.

Another embodiment increases the amount of delivered power by disclosing a near-field, close-coupled system with much larger dimensions and fixed or constrained positioning of the receiver relative to the transmitter providing much greater power transfer to the receiver.

An embodiment discloses a wireless powering-charging system, based on a transmitter that sends a substantially unmodulated beacon (e.g., carrier only) and a receiver that extracts energy from the radiated field of the transmitter to power an electronic device or charge a battery.

The key component of this system is the antennas. Practical antennas should fulfill the following requirements:

Small size. One embodiment may integrate the antenna has to be integrated into a mobile, handheld device. Therefore, the available space for the antenna may be limited.

High efficiency. The antenna should be able to efficiently extract the energy from the electromagnetic field of the transmitter in order to power today's electronic devices or to allow suitable charging times.

Antenna theory provides a fundamental limit that relates antenna size, antenna efficiency and bandwidth to each other. A small antenna that is highly efficient will be very narrowband. An embodiment uses an adaptive tuning circuit.

DEFINITIONS, ACRONYMS AND ABBREVIATIONS

CFR Code of Federal Regulations
FCC Federal Communications Commission
MPE Maximum permissible exposure
USPTO United States Patent and Trademark Office The maximum exposure limits are defined by European and US standards in terms of power density limits (W/m$^2$), magnetic field limits (A/m) and electric field limits (V/m). The limits are related through the impedance of free space, 377Ω.

For the USA, the applicable standard is FCC CFR Title 47:
§2.1091 Radiofrequency radiation exposure evaluation: mobile devices. A mobile device is defined as a transmitting device designed to be used in such a way that the separation distance of at least 20 cm is normally maintained between the transmitter's radiating structure(s) and the body of the user or nearby persons. The limits to be used for evaluation are specified in §1.1310 of this chapter.

§1.1310 Radiofrequency radiation exposure limits (see Table 1).

TABLE 1

FCC limits for radiation exposure
LIMITS FOR MAXIMUM PERMISSIBLE EXPOSURE (MPE)

| Frequency range (MHz) | Electric field strength (V/m) | Magnetic field strength (A/m) | Power density (mW/cm$^2$) | Averaging time (minutes) |
|---|---|---|---|---|
| (A) Limits for Occupational/Controlled Exposures | | | | |
| 0.3-3.0 | 614 | 1.63 | *(100) | 6 |
| 3.0-30 | 1842/f | 4.89/f | *(900/f$^2$) | 6 |
| 30-300 | 61.4 | 0.163 | 1.0 | 6 |
| 300-1500 | | | f/300 | 6 |
| 1500-100,000 | | | 5 | 6 |

TABLE 1-continued

FCC limits for radiation exposure
LIMITS FOR MAXIMUM PERMISSIBLE EXPOSURE (MPE)

| Frequency range (MHz) | Electric field strength (V/m) | Magnetic field strength (A/m) | Power density (mW/cm$^2$) | Averaging time (minutes) |
|---|---|---|---|---|
| (B) Limits for General Population/Uncontrolled Exposure | | | | |
| 0.3-1.34 | 614 | 1.63 | *(100) | 30 |
| 1.34-30 | 824/f | 2.19/f | *(180/f$^2$) | 30 |
| 30-300 | 27.5 | 0.073 | 0.2 | 30 |
| 300-1500 | | | f/1500 | 30 |
| 1500-100,000 | | | 1.0 | 30 | f = frequency in MHz
*= Plane-wave equivalent power density
NOTE 1 TO TABLE 1:
Occupational/controlled limits apply in situations in which persons are exposed as a consequence of their employment provided those persons are fully aware of the potential for exposure and can exercise control over their exposure. Limits for occupational/controlled exposure also apply in situations when an individual is transient through a location where occupational/controlled limits apply provided he or she is made aware of the potential for exposure.
NOTE 2 TO TABLE 1:
General population/uncontrolled exposures apply in situations in which the general public may be exposed, or in which persons that are exposed as a consequence of their employment may not be fully aware of the potential for exposure or can not exercise control over their exposure.

Table 1: FCC Limits for Radiation Exposure

The applicable standard for Europe is EN60215. This has been derived from the ICNIRP (International Commission on Non-Ionizing Radiation Protection) guidelines [ICN]. The limits are given in Table 2.

TABLE 2

European limits for radiation exposure

| Frequency range (MHz) | Electric field strength (V/m) | Magnetic field strength (A/m) | Power density (W/m$^2$) | Averaging time (min) |
|---|---|---|---|---|
| 0.15-1 | 87 | 0.73/f | — | 6 |
| 1-10 | 87/f$^{1/2}$ | 0.73/f | — | 6 |
| 10-400 | 28 | 0.073 | 2 | 6 |
| 400-2000 | 1375 f$^{1/2}$ | 0.0037 f$^{1/2}$ | f/200 | 6 |
| 2000-300,000 | 61 | 0.16 | 10 | 6 |

Embodiments consider the power density limits and magnetic field limits. The US limits are much more generous at frequencies below 30 MHz and could offset the effect of reduced antenna efficiency at low frequency. This application considers a range of frequencies to determine which frequencies are the best for wireless power transfer.

Certain determinations can be made by reviewing the characteristics of the antennas. An "electrically small antenna" is an antenna that can be fitted into a fraction of a radiansphere, which is a sphere of radius rmax $$r_{max} = \frac{1}{k} = \frac{\lambda}{2\pi} = \frac{c}{2\pi f} = \frac{d_{max}}{2} \quad \text{Equation 1}$$

where:
k is the wavenumber in m$^{-1}$
$\lambda$ is the wavelength in m
c is the speed of light 299792458 ms$^{-1}$
f is the frequency in Hz
$d_{max}$ is the diameter of the radiansphere The relative antenna size $d/\lambda_0$ is defined as kr. An "electrically small" antenna has a kr<1.

Electrically small antennas, however, are not in general self-resonant. For low frequencies, the antennas are either capacitive (e.g., a dipole antenna) or inductive (e.g., a loop antenna). These can be approximated for example by a first-order series RC or parallel RL circuit. To obtain resonance in the antenna, a reactor of opposite kind can be tuned based on other characteristics of the antenna.

The equivalent circuit of such an antenna is shown in FIG. 1 for a capacitive kind of antenna.

FIG. 1 illustrates how a main element of the antenna is its radiation resistance $R_r$ 105, shown in FIG. 1, which models the radiated power. A loss resistor $R_L$ 110 models the thermal loss: including, for example, the conduction and dielectric losses of the antenna. Capacitor C 115 is shown as storing the energy $W_e$ and represents the reactive component of the antenna. A matching inductor L 120 forms a resonant circuit with the capacitor 115. According to an embodiment a resonance of the circuit is tuned to the operating frequency which is selected. Equation 2 represents characteristics of this circuit.

$$R_o + j\omega_o L = \underbrace{(R_L + R_r)}_{R_o} - j\frac{1}{\omega_o C}, \quad \omega_o = \frac{1}{\sqrt{LC}} \quad \text{Equation 2}$$

where:
$R_o$ is the source resistance in $\Omega$
$R_a$ is the antenna resistance in $\Omega$
$R_L$ is the loss resistance in $\Omega$
$R_r$ is the radiation resistance in $\Omega$
$\omega_0$ is the resonance frequency in rads$^{-1}$
L is the matching inductance in H
C is the antenna capacitance in F According to an embodiment, and for maximum power transfer, the antenna and matching network impedance is complex conjugate matched at resonance to the antenna impedance.

Figure 2:
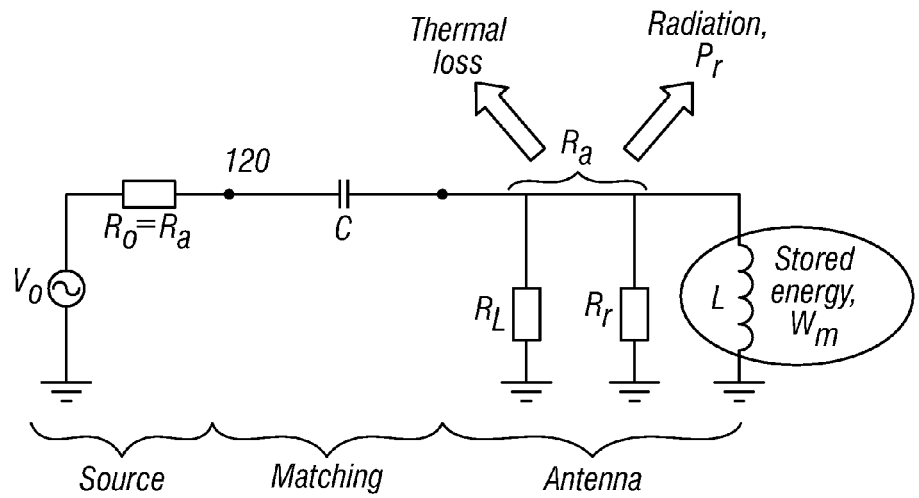
FIG. 2 shows the stored energy in the equivalent circuit.

FIG. 2 illustrates an analogous circuit for the case of an inductive antenna, having similar characteristics.

It has been postulated that if a certain antenna performance is required, the size of an antenna cannot be reduced to an arbitrary value. This postulates that there is a minimum antenna size for a radiation quality factor.

According to theory, an antenna is completely enclosed by a sphere of radius r. The field outside the sphere, as a result of an arbitrary source or current distribution inside the sphere, can be expressed as a sum of weighted spherical waves propagating radially outward. Each wave (mode) exhibits power orthogonality and therefore carries power independently from the others.

It can be mathematically proven that a particular field outside the sphere can be generated with an infinite number of different source distributions. The field outside the sphere is therefore independent from a particular implementation of the antenna.

An antenna that excites only one mode (either TE01 or TM01) has been shown achieves the lowest possible radiation quality factor of any linearly polarized antenna. The radiation quality factor Qr can be expressed as:

$$Q_r = \begin{cases} 2\omega \frac{W_e}{P_r}, & W_e > W_m \text{(capacitive antenna)} \\ 2\omega \frac{W_m}{P_r}, & W_m > W_e \text{(inductive antenna)} \end{cases} = \frac{1}{(kr)^3} + \frac{1}{kr} \quad \text{Equation 3}$$

where: Qr is the radiation quality factor (unitless)
$\omega$ is the radian frequency in rads−1
We is the time-averaged, non-propagating, stored electric energy in J
Wm is the time-averaged, non-propagating, stored magnetic energy in J, and
Pr is the radiated power in W.

Equation 3 shows that a dominant term for electrically small antennas (kr<<1) is the cubic term kr. However, for large antennas (kr>>1) the radiation quality factor will be governed by the linear term.

A physical implementation of an antenna exhibits losses, i.e. its radiation efficiency is smaller than unity due to non-ideal conductors and dielectrics. The reduction of the efficiency has an impact on the overall quality factor, called the antenna quality factor Qa. Assuming the antenna is power-matched to the source, the antenna quality factor Qa results in:

$$Q_a = \eta_r Q_r \quad \text{Equation 4}$$

where: Qa is the antenna quality factor (unitless)

Three important relations can be derived from Equation 3 and Equation 4:

Three important relations can be derived from Equation 3 and Equation 4:

For small antennas the efficiency is proportional to the cube of the relative antenna size and therefore also proportional to the cube of the antenna size and to the cube of the frequency:

$$\eta_r \propto (kr)^3 \propto r^3 \propto f^3 \quad \text{Equation 5}$$

For large antennas the efficiency is proportional to the relative antenna size and therefore also proportional to the antenna size and the frequency:

$$\eta_r \propto kr \propto r \propto f \quad \text{Equation 6}$$

In general, the radiation efficiency is proportional to the antenna quality factor:

$$\eta_r \propto Q_a \quad \text{Equation 7}$$

Figure 4:
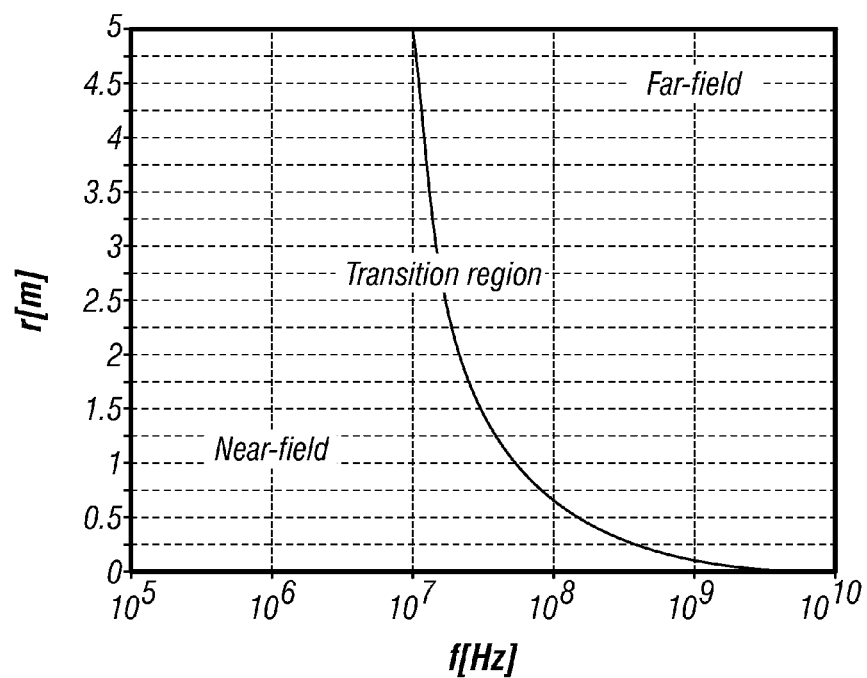
FIG. 4 shows a plot of the near and far field.
Figure 5:
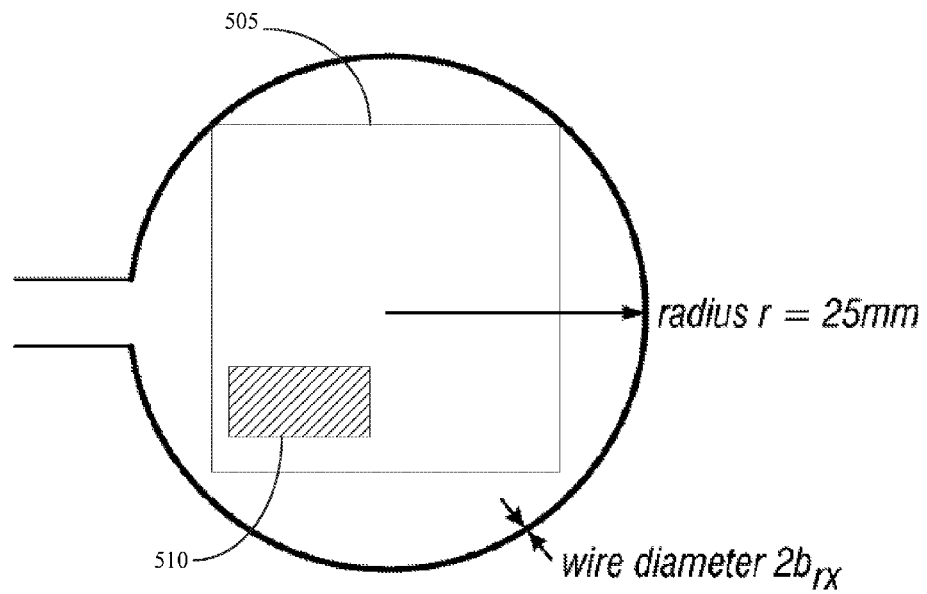
FIG. 5 shows a diagram of the antenna loop geometry.

For the antenna models in FIG. 4 and FIG. 5 the values for radiation quality factor $Q_r$ and radiation efficiency $\eta_r$ are given as:

$$Q_{r,cap} = \frac{\text{Im}\{Z_a\}}{\text{Re}\{Z_a\}} = \frac{1}{\omega_o R_r C} \quad \text{Equation 8}$$

$$Q_{r,ind} = \frac{\text{Im}\{Y_a\}}{\text{Re}\{Y_a\}} = \frac{R_r}{\omega_o L} \quad \text{Equation 9}$$

$$\eta_r = \frac{P_r}{P_{in}} = \frac{R_r}{R_r + R_L} \quad \text{Equation 10}$$

where:
$\eta_r$ is the radiation efficiency (unitless)
$Z_a$ is the antenna input impedance in Ω
$Y_a$ is the antenna input admittance in $\Omega^{-1}$
$P_r$ is the radiated power at resonance in W
$P_{in}$ is the power input to the antenna at resonance in W For a given radiation efficiency, reducing antenna size leads to increased antenna quality factor. For a given antenna size, decreasing radiation efficiency results in lower antenna quality factor. Consequently, for a given radiation efficiency, a higher antenna quality factor is the penalty for a small antenna size. Conversely, the antenna quality factor decreases with increasing frequency and increasing antenna size when the radiation efficiency is kept constant.

Figure 3:
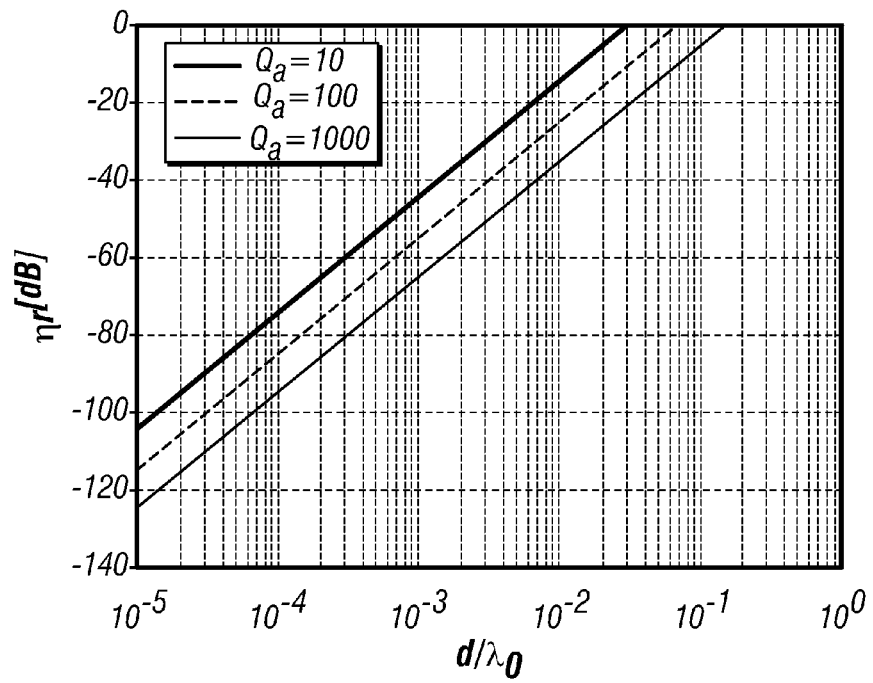
FIG. 3 shows a plot of radiation efficiency.

For the wireless powering and charging system the antenna efficiency determines how much power can be transferred. FIG. 3 shows a plot of the radiation efficiency as a function of relative antenna size and antenna quality factor.

Equation 5 shows that the antenna efficiency is proportional to the cube of the relative antenna size and therefore also proportional to the cube of the absolute antenna size. Increasing the size by a factor of 10 results in an improvement of antenna efficiency of 30 dB (factor 1000), assuming that the antenna quality factor is kept constant.

Equation 7 shows that the antenna quality factor is proportional to the antenna efficiency. Increasing by 10 times the antenna quality factor yields an increase of the antenna efficiency of 10 dB (factor 10), assuming a constant relative antenna size.

Radiation efficiency therefore depends on frequency for different values of the antenna quality factor and antenna dimensions. Antenna efficiency is proportional to the cube of the frequency. An increase by a factor of 10 in the frequency leads to an improvement of the antenna efficiency by 30 dB (a factor of 1000), assuming that the antenna size and the antenna quality factor are kept constant.

Antenna gain and directivity may also be important factors to consider.

The directivity is linked to the gain as follows:

$$G = \eta D \quad (\text{Eq 11})$$

The directivity of a small dipole, for example, may be D=1.5 The same directivity applies also to a small loop. This similarity becomes clear when the principle of duality of the electric and magnetic field is applied, as a small loop can be described as a magnetic dipole.

Higher directivities can be expected from antennas that are not electrically small. This is the case e.g. for a. If the maximum antenna dimension is in the order of a wavelength, the directivity is higher than that of the small dipole. However, for the wireless powering and charging system this is only the case for frequencies above 1 GHz (refer to FIG. 3).

The characteristics of an antenna show a strong dependence on the point (in terms of distance) where their fields are observed. There are two main regions.

Near-field: In the near-field region the electromagnetic energy is mainly stored and not radiated (stationary wave). The boundary for the near field region is usually defined as:

$$kr \ll 1 \leftrightarrow r \ll \frac{\lambda}{2\pi},$$

where:
k is the wave number, and
r the observation distance to the antenna.

Far-field: In the far-field region most of the electromagnetic energy is radiated and not stored. The boundary for this area is usually defined as:

$$kr \gg 1 \leftrightarrow r \gg \frac{\lambda}{2\pi}.$$

A transition from a stationary into a propagating wave occurs between the near-field and the far-field. This area between the stationary and propagating wave is the so-called transition region.

FIG. 4 illustrates the different regions as a function of distance to the antenna and frequency. For a distance of 0.5 to 5 m to the antenna, the boundary (kr=1) between the near-field and the far-field is in the frequency range of 10 to 100 MHz.

Radio waves propagate in a very different manner in the near-field and in the far-field. The Friis transmission equation describes the ratio of received power to power of a transmit antenna, assuming a certain receive and transmit antenna gain, as well as a certain separation between these antennas:

$$\frac{P_{Rx}}{P_{Tx}} = G_{Tx}G_{Rx}\left(\frac{\lambda}{4\pi r}\right)^2 \qquad \text{Equation 12}$$

Equation 12, however, is only valid in the far-field.

In an embodiment, the dipole can also be used to model a loop antenna because of the principle of duality of the electric and magnetic field. Therefore, the electric field component of a dipole corresponds to the magnetic field component of the loop and vice versa.

Equation 13 and Equation 14 show the components of the electric and the magnetic field of a small dipole. The radial component of the electric field has been omitted, as it accounts only for the reactive energy that is stored in the near-field.

$$E_\theta = j\eta\frac{kI_o l \sin\theta}{4\pi r}\left[1 + \frac{1}{jkr} - \frac{1}{(kr)^2}\right]\cdot e^{-jkr} \qquad \text{Equation 13}$$

$$H_\phi = j\frac{kI_o l \sin\theta}{4\pi r}\left[1 + \frac{1}{jkr}\right]\cdot e^{-jkr} \qquad \text{Equation 14}$$

where r is the distance to the antenna and not the antenna radius.

$$E_\theta = j\eta\frac{kI_o l \sin\theta}{4\pi r}\left[1 + \frac{1}{jkr} - \frac{1}{(kr)^2}\right]\cdot e^{-jkr} \qquad \text{Equation 13}$$

$$H_\phi = j\frac{kI_o l \sin\theta}{4\pi r}\left[1 + \frac{1}{jkr}\right]\cdot e^{-jkr} \qquad \text{Equation 14}$$

The received power from a co-polarized antenna, where the transmit and the receive antenna are parallel to each other, is proportional to the time averaged value of the incident field squared as described above. Thus, the path gain can be calculated as follows:

$$G_{path,E_\theta} = \frac{P_{RX,E}}{P_{TX}} = \frac{G_{Tx}G_{Rx}}{4}\left[\frac{1}{(kr)^2} - \frac{1}{(kr)^4} + \frac{1}{(kr)^6}\right] \qquad \text{Equation 17}$$

$$G_{path,H_\phi} = \frac{P_{RX,H}}{P_{TX}} = \frac{G_{Tx}G_{Rx}}{4}\left[\frac{1}{(kr)^2} + \frac{1}{(kr)^4}\right] \qquad \text{Equation 18}$$

Equation 17 represents the propagation law for like antennas (propagation from a dipole to another co-polarized dipole or propagation from a loop to another co-polarized loop. Equation 18 is the propagation law for unlike antennas: e.g. propagation from a dipole to a co-polarized loop or propagation from a loop to a co-polarized dipole.

The path gain assuming $G_{Tx}=G_{Rx}=1$ is much higher than what would be expected by applying the far-field theory. For transmission between like antennas in the near-field, a path loss of 60 dB/decade can be seen, whereas the transmission between unlike antennas in the near-field has a path loss of 40 dB/decade. This is contrasted to the path loss of 20 dB/decade that is seen in the far-field.

Embodiments disclose wireless power transfer in both the near-field and the far-field.

Embodiments recognize that a dipole antenna or a loop antenna may be used for wireless power transfer. A loop antenna is a "magnetic" antenna and may be less sensitive to changes in its surroundings than a dipole, which is an "electric" antenna. The inventors recognize that the portable device will regularly be exposed to changes in its surroundings, e.g. when it placed on a table, held in the hand, or put in a pocket. For this reason, a loop antenna is recommended for the receiver.

An air loop antenna with a maximized cross-sectional area, or a loop antenna with a ferrite core can be used. For at least three reasons, an embodiment may prefer an air loop antenna is over a loop antenna with a ferrite.

The air loop antenna is more resistant to detuning from permanent magnets 510 in its vicinity (such as in the speaker of a mobile telephone 505). The air loop antenna will, in general, be more efficient than the ferrite loop antenna, since an air loop antenna does not have ferrite losses. This statement does depend on the size of each antenna, but clearly the ferrite antenna cannot be arbitrarily large, due to its weight and the fact that it may be difficult to place other components "inside" it. Also, although the air loop antenna will enclose a greater surface area, other components can be placed inside the loop, and the form-factor of the loop can be modified to fit the form-factor of the portable device.

The same type of antenna should be used for the transmitter as for the receiver. However, the transmitter need not be portable. Hence, there are fewer restrictions on the size and form-factor of the transmitter antenna. For example, the receiving antenna can be smaller than the transmitting antenna, although both are preferably the same kind of antenna, e.g., loop or dipole.

A loop antenna is inherently inductive. A capacitive element is required in the tuning circuit to bring that loop antenna to resonance. Even though a loop antenna is less sensitive to changes in its surroundings than a dipole antenna, it will still be dependent on changes in its surroundings. Therefore, adaptive tuning may be useful to maintain a link. Adaptive tuning can include changing the value of the capacitive element, and thus the resonant frequency of the circuit or other circuit parts.

It may be more straightforward to build an adaptive tuning circuit at the transmitter. However, an adaptive tuning circuit being placed also on the receiver side may provide the most flexibility.

In addition, tuning components with high quality factors (Q), e.g., Q>1000, can be used to ensure that that the Q of the overall receiver circuit is degraded as little as possible. Efficiency should be maximized and bandwidth should be as narrow as possible.

FIG. 5 illustrates an embodiment formed of an air loop antenna with maximum dimensions of 5 cm (a radius r of 2.5 cm) and N turns. The loop could, for example, be placed around the perimeter of a mobile device 505 such as a cellular telephone. At this stage, the impact of other electronics near the antenna will not be considered.

A capacitor is used to bring the loop antenna to resonance, required. The size of the capacitor is given by the standard equation for resonant LC circuits:

$$\omega^2 = \frac{1}{LC} \qquad \text{Equation 19}$$

By calculating the inductance of the air loop antenna using Equation 23 and a wire diameter of 500 um, the required capacitance to bring the antenna to resonance can be between 10-14 to 10-7 F.

Figure 6:
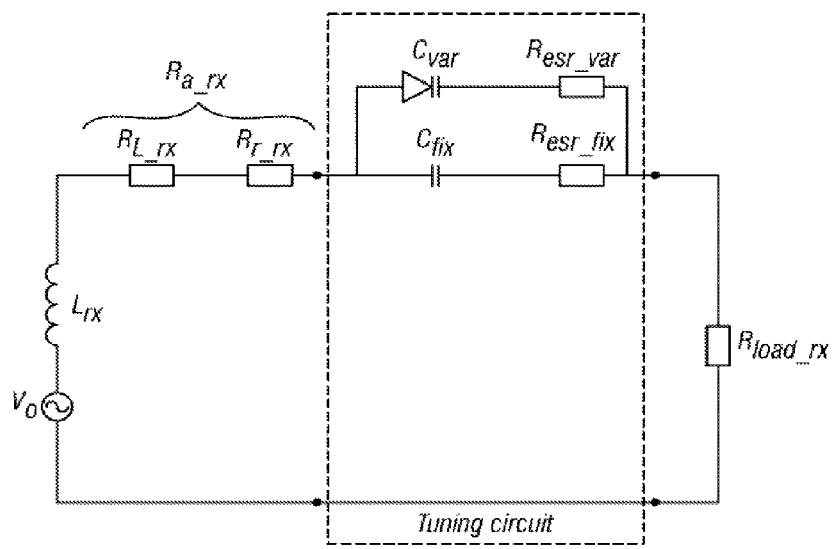
FIG. 6 shows a schematic of a series resonant circuit.

An embodiment may use a high Q fixed chip capacitor in parallel with a high Q varactor diode (voltage-tunable capacitor) to bring the receiver air loop to resonance and to maintain tuning. A schematic of the equivalent series-resonant circuit is shown in FIG. 6.

$V_0$: The induced voltage across the loop antenna $L_{rx}$: The inductance of the loop antenna $R_{L\_rx}$, $R_{r\_rx}$, $R_{a\_rx}$: Receive-antenna loss (ohmic) resistance, radiation resistance and overall antenna resistance (the sum of the previous two)

$C_{var}$, $R_{esr\_var}$: The capacitance of the tuning varactor and its associated Equivalent Series Resistance (ESR)

$C_{fix}$, $R_{esr\_fix}$: The fixed capacitance and its associated ESR $R_{load\_rx}$: The load resistance A goal is to have a tuning range of roughly +/−5 percent of the chosen operating frequency to cover variations in the capacitance and detuning from external factors. In other words, the varactor's tuning range would need to be approximately +/−10 percent the fixed capacitance value. Components should have a high Q, so that they degrade the overall Q of the circuit as little as possible.

In another embodiment, it may be possible to eliminate the varactor diode at the receiver completely and have the transmitter track the receiver resonant frequency. This will be dependent on how much resonant frequency of the receiver loop is affected by changes in the environment near the loop.

Furthermore, at higher frequencies, or with larger loop dimensions, or with more loop turns, a smaller capacitance is required to bring the loop to resonance. In that case, it might be possible to simplify the circuit model of FIG. 6. Instead of a combination of a fixed and a tunable capacitor, only a varactor diode or only a fixed capacitor would be used.

Another effect that needs to be considered is the self-resonance of the loop at higher frequencies. This effect will occur as inter-winding capacitance and stray capacitances on the loop antenna come into resonance with the inductance of the winding itself. This will likely result in a decrease in the loop inductance as frequency increases.

The chosen operating frequency will determine the size of the fixed capacitor. At a low operating frequency such as 1.3 MHz, a large fixed capacitor will be required. For example, the loop antenna with the dimensions given in FIG. 5 with 5 loops would require a fixed capacitance of 3 nF. Capacitance variations of +/−1 percent (30 pF) are typical for these types of capacitors. However, this exceeds the tuning range of most available tunable capacitors. Therefore, at low frequencies the best solution might be to put the adaptive tuning only in the transmitter.

Increasing the operating frequency or increasing the number of turns will reduce the size of the fixed capacitance. With a large number of turns, practical implementation would start to become difficult. A higher frequency therefore appears to bring those benefits.

However, at frequencies of 250 MHz and above, the size of fixed capacitor required is extremely small—e.g., on the order of 1 pF for N=1, and even less for more turns. At these frequencies, the best approach is probably to eliminate the fixed capacitor all together and use only a very small tuning capacitor. This physical limit on capacitor size also puts a limit on the frequencies that can be used for given loop dimensions. 250 MHz is probably the absolute limit with the dimensions used in this study. A smaller receiver loop size would allow a higher frequency or more loops to be used.

High Q/low ESR capacitors with capacitances from the low picofarad to the low nanofarad range should hence be used. These are available from AVX. Others may be available from Vishay, Murata, JTI, Macom, Panasonic and AEC. Details of some potentially suitable AVX capacitors are tabulated in Table 3.

Data for the AVX capacitors at 1.3 MHz is not explicitly given in the datasheet and has not been plotted in the figures below. However, Q and ESR values have been fairly accurately determined by a process of extrapolation and curve-fitting, and the data used in a Matlab script for antenna performance analysis.

TABLE 3

Details of potentially suitable capacitors from AVX

| Capacitor Family (all AVX) | Capacitance Range of Family | Tolerance | Q | ESR | Voltage Rating | Dimensions |
|---|---|---|---|---|---|---|
| HQ series, E case | 3.3 pF to 6800 pF | +/−0.25 pF to +/−1% | Varies according to capacitance and frequency - see FIG. 19 | Varies according to capacitance and frequency - see FIG. 20 | 600 V to 7200 V | 9.4 mm × 9.9 mm × 3.3 mm |
| SQ, AQ or CDR[1] series, style 13 or 14 | 0.1 pf to 5100 pF | +/−1% | Claimed greater than 10000 at 1 MHz | Approx 0.004 at 1 MHz | 50 V | 2.79 mm × 2.79 mm × 2.59 mm |

In general, Q, ESR and C are related by the following equation.

$$C = \frac{1}{\omega R_{esr} Q} \qquad \text{Equation 20}$$

To get this +/−5 percent frequency tuning range, the varactor diode may preferably be variable over a capacitance range one-fifth of the size of the fixed capacitor. This should be achievable for operating frequencies where the required fixed capacitor is in the order of 100 pF. At higher operating frequencies, where the required capacitance is smaller, the fixed capacitor can be eliminated and a quiescent state of the varactor diode would suffice as the fixed capacitance.

GaAs or Silicon abrupt or hyperaprupt tuning varactors with a wide tuning range, low ESR and high Q may be used. One has always to make a tradeoff between wide tuning range and high Q. The devices with the largest tuning ranges have the lowest Q. Products from Sprague-Goodman, Skyworks, Infineon, Aeroflex Metelics, Macom and MDT may be used. MDT is likely the preferred choice for high Q, small tuning range.

A selection from MDT is presented in Table 4. The tuning ranges have been extracted directly from the plots in FIG. 21.

TABLE 4

A variety of high Q, narrow tuning range varactors from MDT

| Manufacturer | Recommended Varactor | Center $C_i$ @ −4 V | Tuning Ratio or Tuning Range | Required Voltage | $Q_{min}$ at 50 MHz² |
|---|---|---|---|---|---|
| MDT | MV34009 | 4.5 pF | 8.3 (Range 2-21 pF) | 2-12 V | 1200 |
| MDT | MV31026 | 10 pF | 13.1 | 2-20 V | 1500 |
| MDT | MV30003 | 1.2 pF | 3.8 (Range 0.3-4.2 pF) | 2-12 V | 3000 |
| MDT | MV31011 | 0.5 pF | 5.5 | 2-20 V | 4000 |

Another embodiment may use MEMS Varactors. Philips has MEMS varactors with a Q of 300 to 400. MEMS varactors would likely bring lower power consumption.

Figure 7:
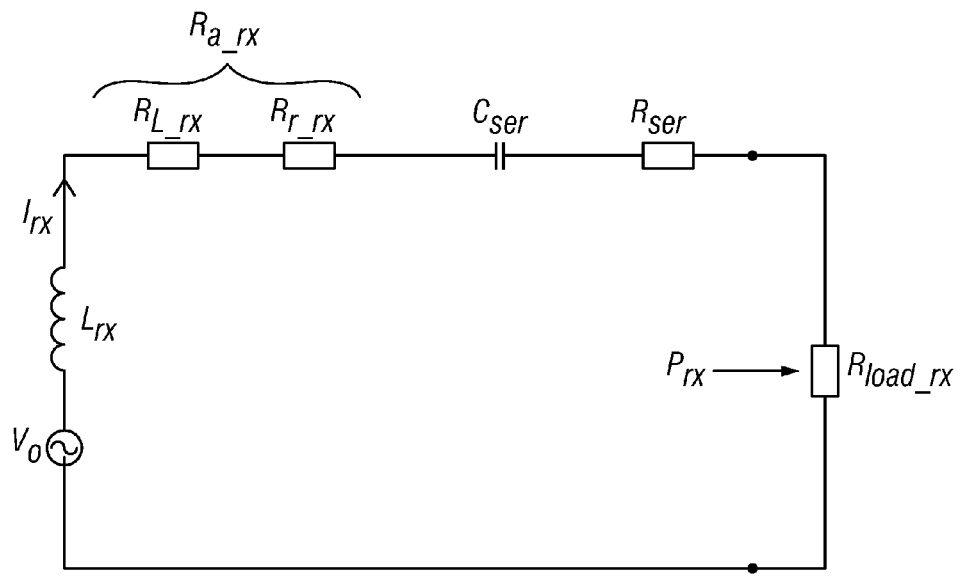
FIG. 7 shows a simplified circuit schematic.

An analysis of the circuit of FIG. 6 at resonance will explain performance. In a first approach, the varactor is replaced by a fixed value capacitor one-tenth the size of the main fixed capacitor. The AVX data will be used for both capacitors. The first step is to reduce the parallel capacitor combination in FIG. 6 to its series equivalent at resonance. This provides a simplified circuit shown in FIG. 7, where:

$I_{rx}$: Current in the receiver loop
$P_{rx}$: The power available at the load resistor
$C_{ser}$: The equivalent series capacitance of the fixed capacitor and the varactor
$R_{ser}$: The equivalent series resistance of the fixed capacitor and the varactor At resonance, the reactances can be neglected since XL=−Xc. Only the resistive (real) losses in the circuit need be considered. It can be shown that when the resistances of the tuned antenna are matched to the load resistance, the maximum amount of power Prx is available at the load. In other words, the optimum condition is when R L_rx+Rc-rx+R ser=R'oad_rx.

For an embodiment, an air loop antenna with maximum dimensions of 20 cm (Le. a radius r of 10 cm), a wire radius of 1 mm and a single turn (N=1) will be investigated. It could, for example, sit vertically on a bench or a table inside the home.

The required capacitance for resonance at different frequencies according to Equation 19 is given in Table 5.

TABLE 5

Required capacitance for resonance at different frequencies

| Frequency (MHz) | Required Capacitance |
|---|---|
| 1.3 | 17.85 nF |
| 13.56 | 164.1 pF |
| 64 | 7.365 pF |
| 250 | 0.483 pF |
| 500 | 0.121 pF |

In the study of small antennas, the inventors found that that the equations used may be outside their valid range. Many equations are approximations of very complex physical situations. As stated above, the transmitter may be given the size of a typical small home appliance. The maximum dimension of the unit (i.e. the diameter of the loop) is 0.2 m. The receiver has been given the dimension of a typical portable device such as a mobile phone. The maximum dimension of the unit (i.e. the diameter of the loop) is 0.05 m. These may be considered as particularly preferred values.

In order to obtain good results, the following parameters can be considered.

The total unwound electrical length should not exceed $\lambda/10$. The wire radius should be much smaller than the radius of the loop. This is a particular condition for the calculation of the loop inductance, and is also necessary to be able to physically wind the coil. The frequency should be high enough such that the skin depth is less than the radius of the wire. The distance between the loops must be much greater than, e.g., at least 5 times greater than, the dimensions of either loop. This condition is easily met with the chosen dimensions. If this were not the case, mutual coupling between the two loops would have to be considered, particularly if the loops are aligned on-axis.

Coaxial alignment of the loops may be the optimum positioning for the near-field. At frequencies in the far-field, the loops are assumed to be positioned side-by-side. This may be the optimum positioning for the far-field.

Also, for optimum power transfer, the receiver antenna can be matched to the load, and the source can be matched to the transmit antenna.

FIGS. 8A-8D illustrate available power at the receiver's load resistor for different antennas. Each of these antennas is defined to have a loop diameter of 50 mm and the transmitter a loop diameter of 0.2 m. The two loops are aligned on-axis in the near-field and side-by side in the far-field.

Figure 8A:
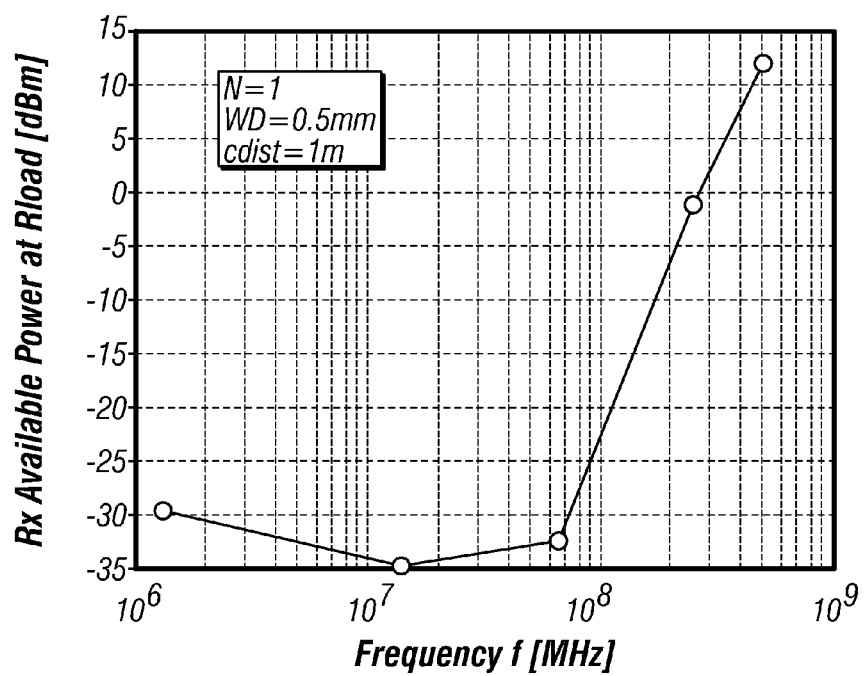
FIGS. 8A-8D show received power plots.
Figure 8B:
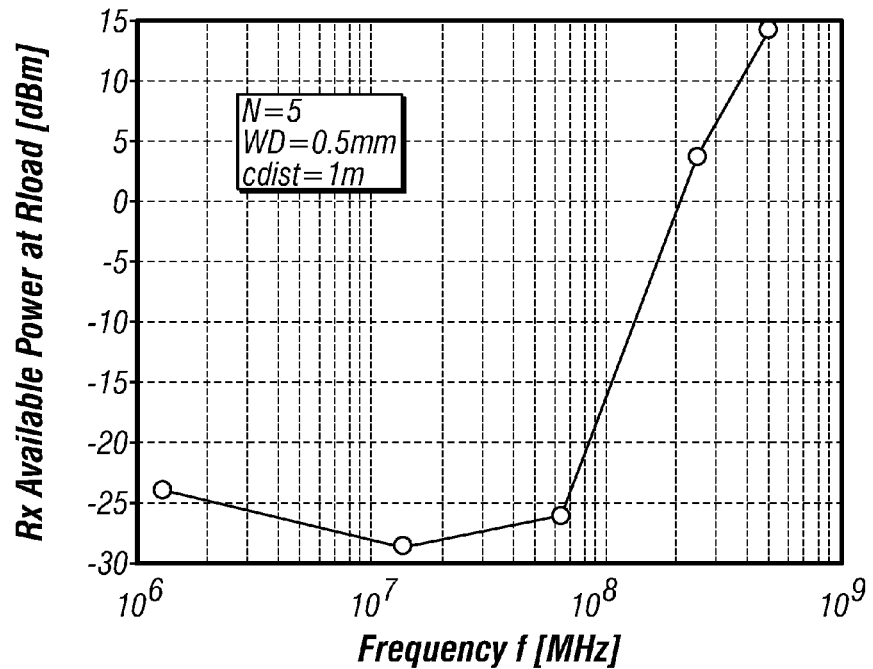
Figure 8C:
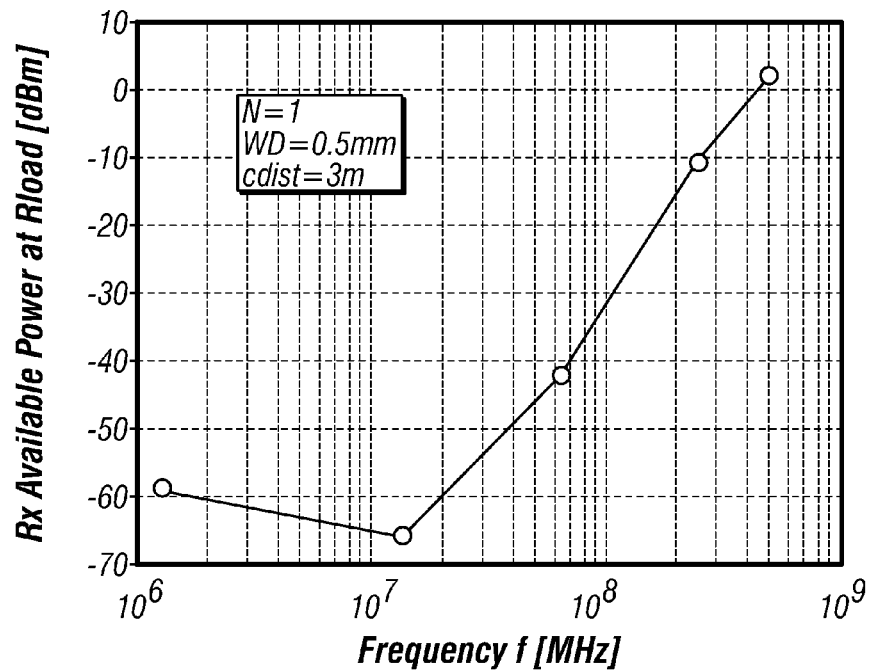
Figure 8D:
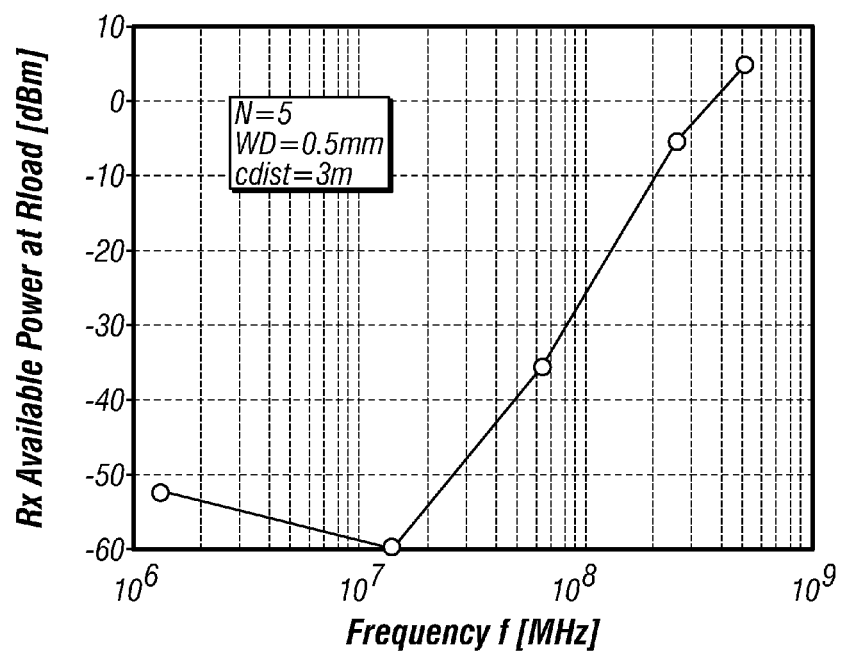

In FIG. 8A, the number of turns on the receiver is N=1, the wire diameter is 0.5 mm, the on-axis distance from the receiver coil to the transmitter coil is 1 m. In FIG. 8B, the number of turns on the receiver is N=5, the wire diameter is 0.5 mm, the on axis distance from the receiver coil to the transmitter coil is 1 m. In FIG. 8C, the number of turns on the receiver is N=1, the wire diameter is 0.5 mm, the on axis distance from the receiver coil to the transmitter coil is 3 m. In FIG. 8D, the number of turns on the receiver is N=5, the wire diameter is 0.5 mm, the on¬axis distance from the receiver coil to the transmitter coil is 3 m.

These plots show how the efficiency of the receiver antenna increases with frequency.

Figure 9A:
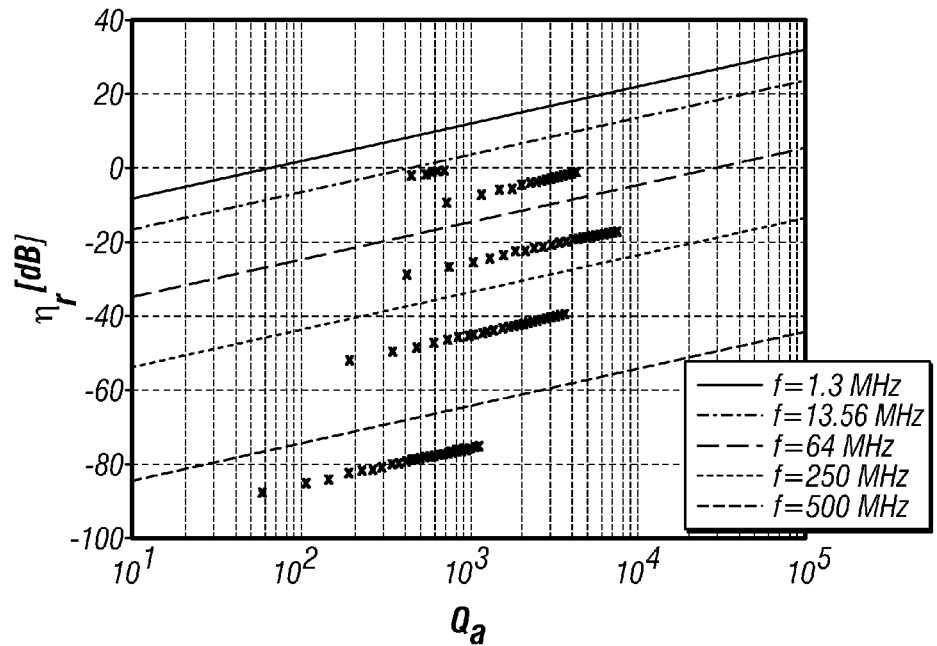
FIGS. 9A-9B show antenna efficiency plots.
Figure 9B:
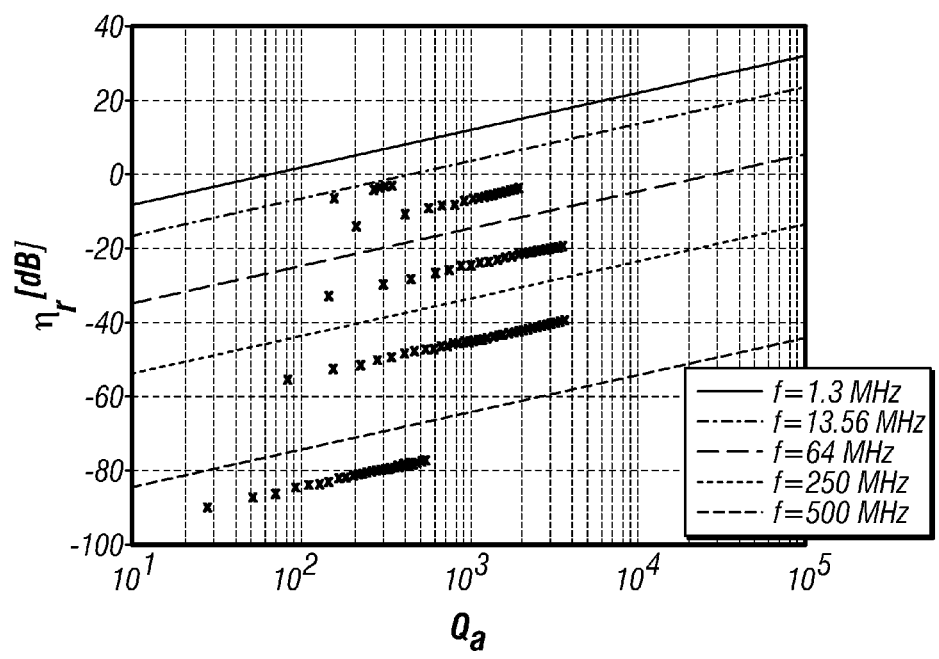

FIGS. 9A and 9B shows the efficiency values, with FIG. 9A showing unloaded efficiency versus quality factor at different frequencies. Dotted lines show the efficiency of the loop antenna for different number of turns (N=1 to 30). For both sets of curves different frequencies have been analyzed, resulting in different relative antenna sizes (physical antenna size relative to wavelength). The inventors found that for all results, the efficiency of the loop antenna was always approximately 11 dB below the predicted theoretical limit.

FIG. 9B plots the loaded quality factor and efficiency have been plotted instead of the unloaded quality factor and efficiency. The difference between the maximum possible antenna efficiency and the efficiency of the loop antenna is still approximately 11 dB.

FIGS. 8A-8D show the power available at the receiver for transmitter-receiver separations of 1 m and 3 m. These distances were chosen because they are reasonable for the operating environment of the wireless power transfer system. At these distances, the frequencies 1.3 MHz and 13.56 MHz can be considered to be in the near-field, while 64 MHz, 250 MHz and 500 MHz can be considered to be in the far-field.

With the exception of 1.3 MHz, the amount of power received increases monotonically with frequency. The exception at 1.3 MHz is directly attributable to the more relaxed FCC restrictions on H field strength at this frequency. This temporarily dominates the trend of increasing received power with increasing efficiency. More power is received at higher frequencies because the antenna efficiency increases rapidly as the antenna dimensions become greater relative to a wavelength.

At 1.3 MHz, a transmitter-receiver separation of 1 m and with physical constraints described above, the expected power at the load is around −20 to −30 dBm (depending on the number of turns). By increasing the distance to 3 m, the received power level decreases by about 30 dB (a factor of 1000). This is also true at 13.56 MHz, which also is in the near-field. At the far-field frequencies, increasing the separation from 1 to 3 meters decreases the received power by about 10 dB (a factor of 10). Two conclusions can be drawn: Firstly, the amount of power that would be received by a system operating at frequencies in the low MHz range is negligible, unless the separation between transmitter and receiver is very small. Secondly, changes in separation of 1 or 2 meters would cause large fluctuations in the received power.

At higher frequencies and with a separation of 1 to 3 m, the scenario is then far-field and the picture improves somewhat. The amount of power received at 250 MHz, for example, could exceed 0 dBm (1 mW) depending on the configuration. Also, the fluctuations in received power with changes in separation between transmitter and receiver are not so extreme.

The above analysis always ensures that the MPE limits are never exceeded. The MPE limits are blanket limits that put an absolute upper bound on allowed levels of non-ionizing radiation at all frequencies across 1 to 500 MHz band. At particular frequencies within this band, the US and European regulators have certainly introduced additional, stricter limits on radiation levels, mainly to avoid interference or conflict between the many users of the radio frequency spectrum.

Also, in order to achieve the far-field performance shown in the plots, the antennas need to be arranged side by side. Other orientations of the loops could result in significantly less, or even no power being transferred. For example, if the Rx loop in FIG. 28 was rotated 90° so as to be perpendicular to the plane of the Tx loop (and the page), no power would be received.

The higher frequencies will result in higher losses in the rectifier electronics than the low frequencies. Thus overall efficiency must reach an optimum at some frequency, and then begin to decrease as the frequency increases.

At frequencies of 250 MHz and above, the practical implementation may become more difficult due to the very small <<1 pF) capacitors needed for resonance. Self resonance of the receiver coil could also be an issue.

The above shows how the efficiency of the receiver antenna changes when the frequency is increased and when the number of turns is increased. The efficiency increases rapidly with frequency such that about an 80 dB improvement is obtained by increasing the frequency from 1.3 MHz to 250 MHz. The efficiency is thus a key factor in determining the best operating frequency for the wireless power transfer system. The number of turns initially has a large effect on the efficiency, but after about 5 turns, the impact is negligible. The effect of the tuning circuit and the load on the circuit efficiency is given by the difference between the loaded and the unloaded efficiency. In general the effect of the tuning circuit and load is to lower the efficiency by about 4 dB (3 dB from the matched load and 1 dB from the tuning circuit).

The above also shows how the quality factor of the receiver antenna changes when the frequency is increased and when the number of turns is increased. The quality factor reaches a maximum at around 250 MHz and then decreases. This is because the larger series resistances in the circuit starts to dominate Equation 29 at higher frequencies. An increasing number of turns at first has a larger impact in raising the quality factor. After about 5 turns, the effect becomes negligible. The tuning circuit itself has a high Q and does not substantially impact on the loaded Q too much. Most of the degradation of the loaded Q factor (compared to the unloaded Q) is because the power matching condition is strictly enforced in the simulation: The presence of the matched load resistor rx in FIG. 23 essentially doubles the series resistance in the circuit. According to Equation 29, this will result in a reduction in the loaded Q.

The plots above also show how the bandwidth of the receiver antenna changes when the frequency is increased and when the number of turns is increased. The bandwidth of the series resonant circuit increases with frequency and decreases with the number of turns. At 250 MHz and a single turn, the loaded bandwidth is slightly above 1 MHz.

In summary of the above, therefore, a wireless power system can be made.

Maximum permissible exposure regulations limit the transmit power allowed into an antenna. For low frequencies higher field strengths are usually specified. Furthermore, European regulations define a lower power density (field strength) limit than FCC regulations.

FCC (US) and European regulators have placed limits on the maximum allowed non-ionising radiation emissions (MPE Limits). It must be noted that the MPE Limits are blanket limits—separate standards limit the permissible radiation levels in particular bands, and these are stricter than the MPE limits. The "towards a practical implementation" phase of this study has always assumed that the FCC limits apply.

Efficiency, quality factor and size are limiting parameters in antenna design. Small sized antennas will only have low efficiency or a high quality factor. For small antennas, increasing antenna size or operation frequency by a factor of 10 results in an improvement of antenna efficiency by 30 dB, assuming that antenna quality factor is kept constant. Increasing the antenna quality factor by a factor of 10 results in 10 dB more efficiency, assuming that relative antenna size is kept constant.

Antenna gain is not physically limited. However, for a constant antenna size, gain will generally be smaller at lower than at higher frequencies.

Radio wave propagation in the near-field differs substantially from that in the far-field. Usually, the field strength decays by 60 dB/decade distance in the near-field, whereas a drop of only 20 dB/decade is observed in the far-field.

Wireless power transfer system may be betting using tuned loop antennas with an air substrate as opposed to ferrite core antennas or dipole antennas. Loop antennas are more robust to detuning than other antenna types.

In particular, the loop antenna at the receiver will be affected (detuned) by changes in its near environment. A variable capacitor at least on the transmitter side and probably also on the receiver side would be necessary to compensate for this. A varactor diode appears to be the best candidate for tuning the receiver loop antenna, and has been considered in this study.

The resulting recommended circuit topology is a series resonant RLC circuit for both the receiver and the transmitter. Power matching between the source and the transmit antenna and between the receive antenna and the load ensures that maximum power is delivered to the load.

A range of operating frequencies for this system have been investigated, ranging from 1.3 MHz to 500 MHz. However, limits in the size of the tuning capacitors (less than 1 pF is difficult) restrict the maximum operating frequency to about 250 MHz for the antenna dimensions considered in this study. The effect of loop self-resonance due to inter wining and stray capacitances has not been considered at this stage.

Circuit analysis shows that with the exception of low frequencies (1.3 MHz), the available received level increases monotonically and efficiency increases in a Similar way.

If the system is operating in the near-field (I.e. low frequencies), movement of the receiver could cause very large fluctuations in received power level. An increase of transmitter to receiver separation from 1 m to 3 m could reduce the received power by a factor of 1000. In the far-field, the fluctuations would be much reduced, in the order of a factor of 10. Therefore, it would be preferable to run the system at higher frequencies and in the far-field.

The previous point does not consider some other factors, which may impact on the chosen frequency:

Once the rectifying and charging circuit has been considered, overall efficiency (and thus available power) will be further reduced. It could also lead to a change in the optimum frequency.

The position and orientation of the Rx loop antenna relative to the Tx loop antenna is critical. In the near-field, arranging the loops coaxially results in optimum power transfer. In the far-field, arranging the loops side by side results in the optimum power transfer. Small changes to loop orientation, such as rotating one loop so that is perpendicular to the other loop, would result in zero power transfer.

The efficiency of a loop antenna is 11 dB below the maximum efficiency antenna efficiency predicted by theory. The reason for this is that the loop makes only poor use of the volume available in a radiansphere. Different antennas can get closer to this theoretical limit. However, they can never surpass it.

The only way to consistently achieve the best orientation would be to have the user place the portable device in a desk-mounted fixture, which is contrary to the concept of a portable, wireless charging unit.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

For example, other antenna forms and selections can be used. The term "power" as used herein can refer to any kind of energy, power or force transfer of any type.

The receiving source can be any device that operates from stored energy, including a computer or peripheral, communicator, automobile, or any other device.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The operations and/or flowcharts described herein may be carried out on a computer, or manually. If carried out on a computer, the computer may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cell phone, or laptop. Moreover, the method steps and operations described herein can be carried out on a dedicated machine that does these functions.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A wireless power reception system, comprising:
   a receiver coil disposed about a perimeter of a mobile device; and
   a wireless power receiver circuit coupled to the receiver coil, the wireless power receiver circuit and the receiver coil configured to receive power via a wireless field at a first frequency, the received wireless power sufficient to charge or power a load, the wireless power receiver circuit and the receiver coil having an inductance and a capacitance such that the wireless power receiver circuit and the receiver coil are configured to resonate at a resonant frequency that is substantially equal to the first frequency, the receiver coil having a ferrite-less core being resistant to degradation of a resonant condition of the receiver coil and the wireless power receiver circuit from permanent magnets in the mobile device.

2. A wireless power reception system as in claim 1, further comprising a tuning part configured to tune at least one component in said wireless power receiver circuit to adjust the resonant frequency.

3. A wireless power reception system as in claim 2, wherein said tuning part is configured to tune a component of said wireless power receiver circuit to adjust for an error caused by variations in component values.

4. A wireless power reception system as in claim 1, wherein the wireless power receiver circuit includes a capacitor, and wherein said capacitor has a Q value greater than 1000.

5. A wireless power reception system as in claim 2, wherein said tuning part comprises a MEMS based variable capacitor.

6. A wireless power reception system as in claim 1, wherein the receiver coil includes an inductor, and wherein said inductor comprises a wire loop antenna.

7. A wireless power reception system as in claim 1, wherein the receiver coil and the wireless power receiver circuit are configured to receive power via the wireless field from a wireless power transmitter.

8. A wireless power reception system as in claim 7, wherein the transmitter includes a transmit coil, and wherein the receiver coil and the transmit coil are positioned such that the receiver coil is within the near field of the wireless field transmitted by the transmit coil, and wherein the transmit coil and the receiver coil are coaxial to one another.

9. A wireless power reception system as in claim 7, wherein the transmitter includes a transmit coil, and wherein the receiver coil and the transmit coil are positioned such that the receiver coil is within the far field of the wireless field transmitted by the transmit coil, and wherein the transmit coil and the receiver coil are positioned adjacent to one another.

10. A method of receiving wireless power, comprising:
receiving power with a receiver coil disposed about a perimeter of an electronic device and a wireless power receive circuit via a wireless field at a first frequency, the receiver coil having a ferrite-less core that is resistant to degradation of a resonant condition of the receiver coil and the wireless power receive circuit from permanent magnets in the mobile device, and the received wireless power sufficient to charge or power a load; and
adjusting a component of the wireless power receive circuit to adjust at least one of an inductance and a capacitance of the wireless power receive circuit and the receiver coil such that the wireless power receive circuit and the receiver coil are configured to resonate at a resonant frequency that is substantially equal to the first frequency.

11. The method as in claim 10, wherein adjusting a component comprises tuning the component of said wireless power receive circuit to adjust for an error caused by variations in component values.

12. An apparatus for receiving power via a wireless field, comprising:
means for receiving power with via the wireless field at a first frequency, the means for receiving power comprising a ferrite-less core and configured to be disposed about a perimeter of an electronic device and resistant to degradation of a resonant condition of the means for receiving power from permanent magnets in the electronic device, and the received power sufficient to charge or power a load; and
means for adjusting a component of the means for receiving power to adjust at least one of an inductance and capacitance of the means for receiving power such that the means for receiving power is configured to resonate at a resonant frequency that is substantially equal to the first frequency.

13. The apparatus as in claim 12, wherein the means for receiving power comprises a wireless power receive circuit and a receiver coil.

14. The apparatus as in claim 13, wherein the means for adjusting a component comprises means for tuning the component of said wireless power receive circuit to adjust for an error caused by variations in component values.

15. The apparatus as in claim 12, wherein the means for receiving power comprises an air core.

16. The system as in claim 1, wherein the receiver coil comprises an air core.

17. The method as in claim 10, wherein the receiver coil comprises an air core.

18. The method as in claim 10, wherein the component of the wireless power receive circuit is tunable.

19. The apparatus as in claim 13, wherein the component of the wireless power receive circuit is tunable.

* * * * *